(12) United States Patent
Grenchus et al.

(10) Patent No.: US 7,587,767 B1
(45) Date of Patent: Sep. 8, 2009

(54) SYSTEMS AND METHODS OF TRANSFERRING COMPUTER HARDWARE

(75) Inventors: Edward J. Grenchus, Vestal, NY (US); Michael F. Charnetsky, Binghamton, NY (US); David P. Kolosna, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/127,255

(22) Filed: May 27, 2008

(51) Int. Cl.
*G06F 1/26* (2006.01)
*G06F 11/00* (2006.01)
*G08B 13/00* (2006.01)

(52) U.S. Cl. .............. 726/34; 726/16; 726/17
(58) Field of Classification Search .......... 726/34, 726/16, 17
See application file for complete search history.

(56) References Cited

U.S. PATENT DOCUMENTS

| | | | | |
|---|---|---|---|---|
| 6,012,145 | A * | 1/2000 | Mathers et al. ............ | 726/17 |
| 7,188,235 | B2 * | 3/2007 | Wang et al. ............... | 713/1 |
| 2001/0022617 | A1 * | 9/2001 | Takaba et al. ............. | 348/207 |
| 2004/0268073 | A1 * | 12/2004 | Morisawa ................. | 711/164 |
| 2005/0138399 | A1 * | 6/2005 | Cheston et al. ........... | 713/189 |
| 2006/0041932 | A1 * | 2/2006 | Cromer et al. ............ | 726/6 |
| 2008/0046998 | A1 * | 2/2008 | Cromer et al. ............ | 726/17 |
| 2008/0177598 | A1 * | 7/2008 | Davie ...................... | 705/7 |

OTHER PUBLICATIONS

Best Practices in IT Recycling: Two Obstacles With One Solution, IBM paper, Aug. 2004.

\* cited by examiner

*Primary Examiner*—Nasser Moazzami
*Assistant Examiner*—David Garcia Cervetti
(74) *Attorney, Agent, or Firm*—Jackson Patent Law Office (57) ABSTRACT

Disclosed are systems and methods of transferring computer hardware from one set of users to another set of users. An exemplary receives units of circuitry from a plurality of business entities, and determines if access to a unit is blocked by lack of a primary password. If access is blocked, the method determines whether a value of the unit exceeds a threshold. If the value exceeds a threshold, the method attaches a connector to the unit, uses the processor to send a first set of signals into a hardware port of the unit via the connector, and receives a visual signal from the unit.

1 Claim, 10 Drawing Sheets

SYSTEMS AND METHODS OF TRANSFERRING COMPUTER HARDWARE

BACKGROUND OF THE INVENTION

1. Field of the Invention

This invention relates generally to systems and methods of managing computer systems and, more particularly, to systems and methods of transferring computer hardware from one set of users to another set of users.

2. Description of Related Art

A substantial percentage of personal computer (PC) hardware, returned to recovery or recycling centers, is not processed for reuse intact, and is instead dispositioned for scrap processing. Scrapping prevents realization of the numerous environmental benefits associated with reutilization of both the PC and hard drive.

Furthermore, from a financial perspective, scrapping of functional PCs and hard drives also inhibits secondary channel sales ability (brokering of PCs and hard drives externally) and minimizes potential recoveries.

SUMMARY OF THE INVENTION

To address the problem above, there is a method of operating with a processor having access to a plurality of programs, each program configured to communicate with a respective type of circuitry. The method comprises receiving units of circuitry from a plurality of business entities, the receiving step including receiving primary passwords for a subset of the units; determining if access to a unit is blocked by lack of a primary password; attaching a connector to the unit; if the determining step determines that access is blocked, using the processor to send a first set of signals into a hardware port of the unit via the connector; subsequently receiving a signal from the unit; and depending on the signal received from the unit, using the processor to conditionally execute one of the programs, to send a second set of signals into the hardware port of the unit via the connector, thereby unblocking access to the unit.

BRIEF DESCRIPTION OF THE DRAWINGS

References are made to the following text taken in connection with the accompanying drawings, in which.

The accompanying drawings which are incorporated in and which constitute a part of this specification illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

Figure 1:
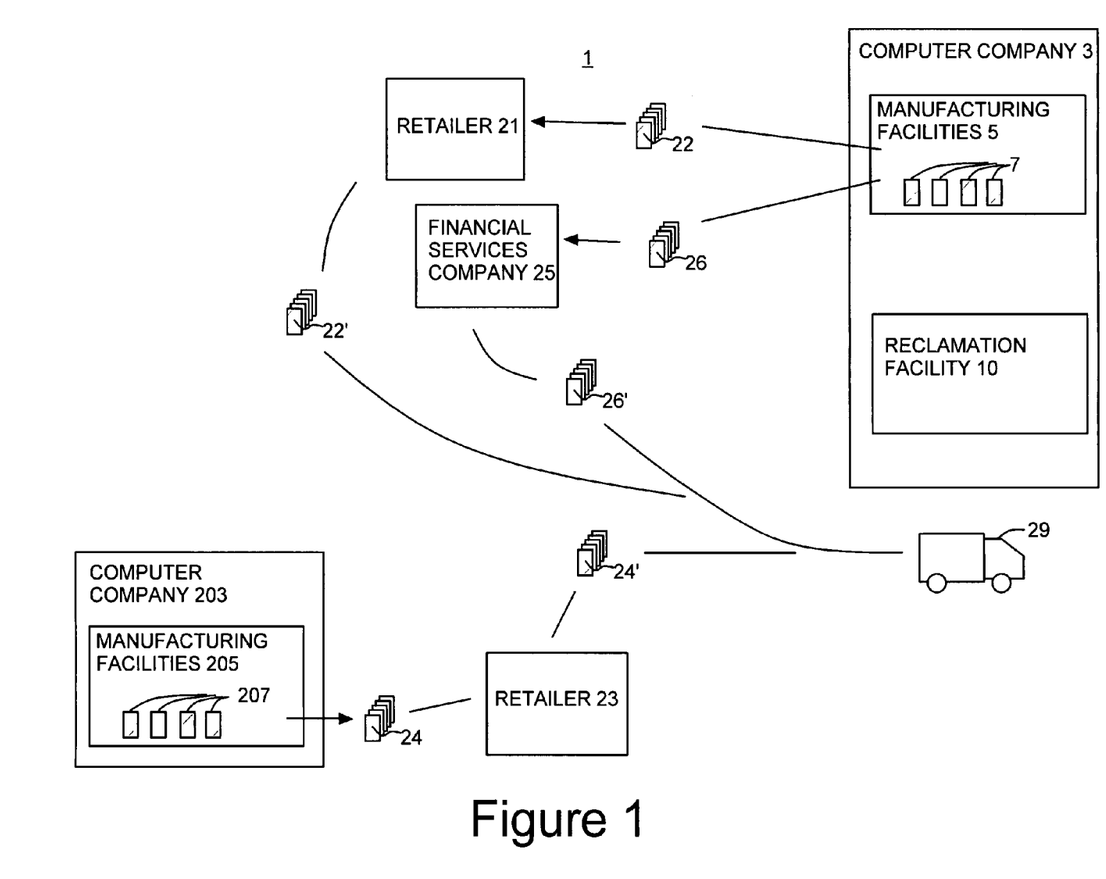
FIG. 1 is a diagram of an exemplary system in accordance with an embodiment of the present invention.

FIG. 1 shows system 1 according to an exemplary embodiment of the present invention. Computer company 3 controls manufacturing facilities 5. Manufacturing facilities 5 assemble computer systems 7. Each system 7 includes a processor board having a Basic Input/Output System (BIOS), and a disk drive housing enclosing a magnetic storage disk. The BIOS is code that controls basic hardware operations, such as interactions with disk drives, hard drives, and the keyboard. The BIOS of system 7 includes a program that allows normal BIOS password processing to be substituted with different processing, provided that the BIOS receives certain signals via the USB port, as described in more detail below.

Manufacturing facilities 5 transfer computer hardware set 22, containing multiple systems 7, to retailer 21. This transfer of computer hardware set 22 is pursuant to a lease agreement between computer company 3 and retailer 21. Retailer 21 uses computer hardware set 22 in the course of doing business.

Manufacturing facilities 5 transfer a computer hardware set 26, containing multiple systems 7, financial services company 25. This transfer of computer hardware set 26 is pursuant to a sale agreement between computer company 3 and company 25. Company 25 uses computer hardware set 26 in the course of doing business.

At end and of the lease agreement between retailer 21 and computer company 3, computer company 3 receives hardware set 22' from retailer 21, and hardware passwords for some of the processors and disks in hardware set 22'. Hardware set 22' includes most of the systems 7 that were in hardware set 22. Typically, hardware set 22' will include all (100%) of the systems 7 that were in hardware set 22. Hardware set 22' includes more than 50 systems 7.

More than a year after the transfer of hardware set 26 to financial services company 25, computer company 3 receives hardware set 26' from financial services company 25, and hardware passwords for some of the processors and disks in hardware set 26'. Hardware set 26' includes most of the systems 7 that were in hardware set 26. Typically, hardware set 26' will include all (100%) of the systems 7 that were in hardware set 26. Hardware set 26' includes more than 50 systems 7.

Computer company 203 controls manufacturing facilities 205. Manufacturing facilities 205 assemble computer systems 207. Each system 207 includes a processor board having a Basic Input/Output System (BIOS), and a disk drive housing enclosing a magnetic storage disk. The BIOS of system 207 includes a program that allows normal BIOS password processing to be substituted with different processing, provided that the BIOS receives certain signals via the USB port, as described in more detail below.

Manufacturing facilities 205 transfer computer hardware set 24, containing multiple systems 207, to retailer 23. This transfer of computer hardware set 24 is pursuant to a sale agreement between computer company 203 and retailer 23. Retailer 23 uses computer hardware set 24 in the course of doing business.

Computer company 3, computer company 203, retailer 21, financial services company 25, and retailer 23 are non-affiliated, meaning that they are not affiliates with respect to each other. Is this patent application, concerns are affiliates of each other when one concern controls or has the power to control the other, or a third party or parties controls or has the power to control both. Power to control is described in Section 121 of the U.S. regulations of the Small Business Administration.

More than a year after the transfer of hardware set 24 from computer company 203 to retailer 23, computer company 3 receives hardware set 24' from retailer 23, and hardware passwords for some of the processors and disks in hardware set 24'. Hardware set 24' includes most of the systems 207 that were in hardware set 24. Typically, hardware set 24' will include all (100%) of the systems 207 that were in hardware set 24. Hardware set 24' includes more than 50 systems 207.

Hardware sets 21', 22', and 23' arrive together at reclamation facility 10 on truck 29. Computer company 3 controls reclamation facility 10.

Figure 2:
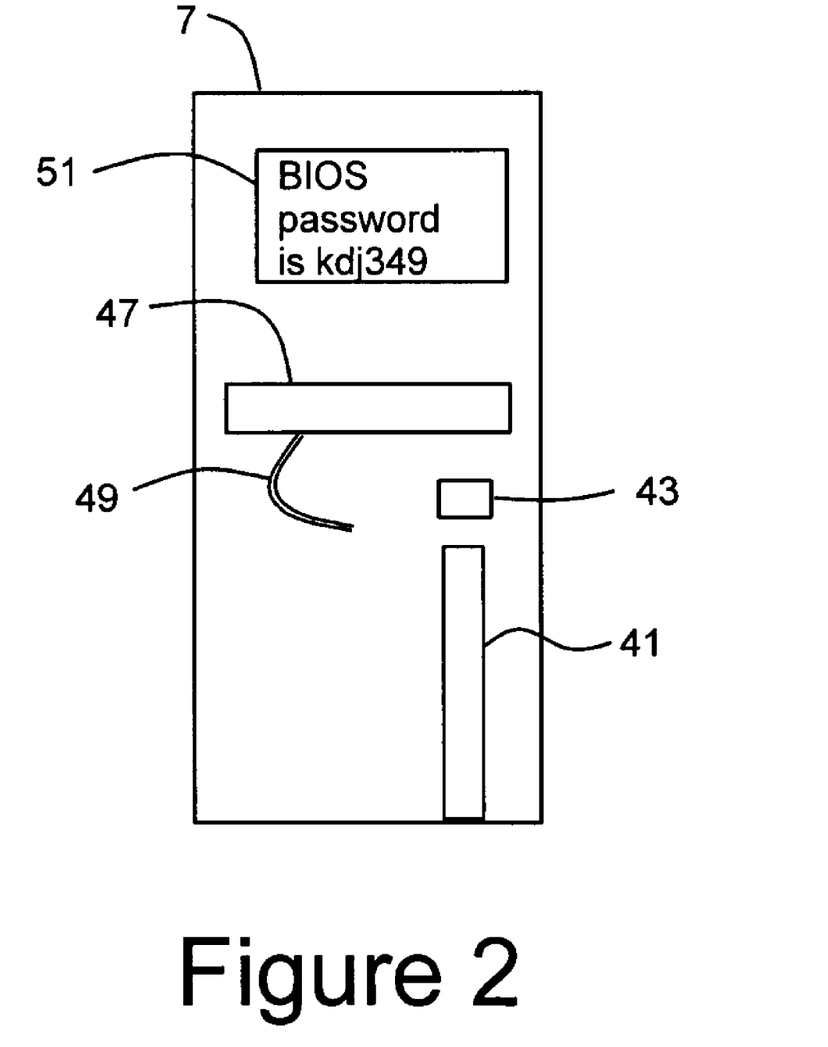
FIG. 2 is a diagram emphasizing an aspect of the system shown in FIG. 1.

FIG. 2 also shows a back view of a system 7 received in hardware set 22' from retailer 21. System 7 includes a processor board 41, a disk housing 47, and a cable 49 connected to disk housing 47. USB port 43 is connected to processor board 41.

A paper slip 51 is attached to the system 7 shown in FIG. 2. Paper slip 51 was taped to systems 7 by personnel in retailer 21. Paper slip 51 bears the hardware (mother or system board) password and/or hard drive passwords that were selected and set by personnel in retailer 21. Some systems 7 and 207 received at facility 10 will not be associated with a slip 51, or other means of conveying a password.

Figure 3:
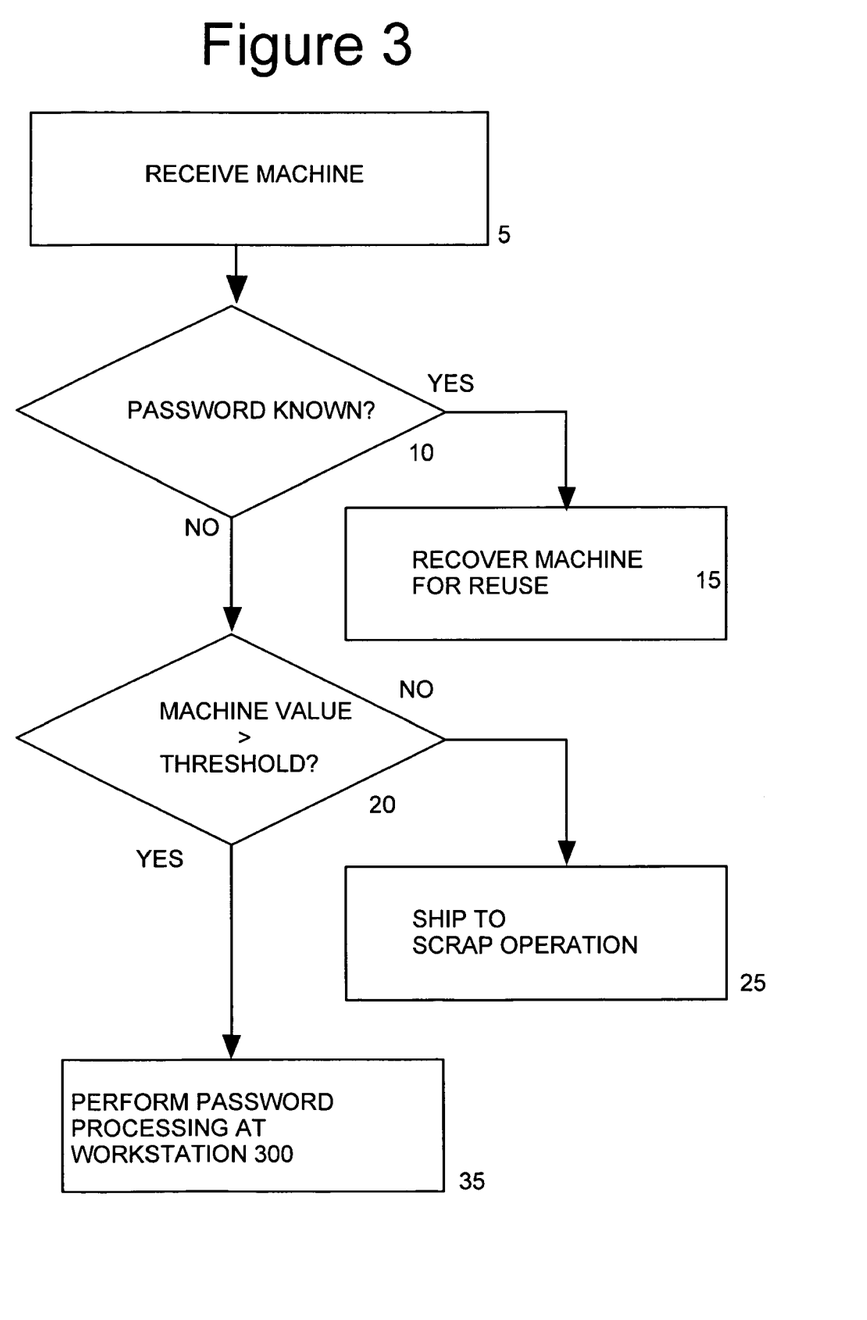
FIG. 3 is a flow chart of a process performed in the exemplary system.

FIG. 3 shows a flow diagram of a process performed in reclamation facility 10. A workstation in facility 10 receives a system, such as a system 7 or a system 207, from truck 29 (step 5). A human operator at the workstation determines whether the BIOS password of processor board 41 is known (step 10). The password could be known via a variety of means, for example hard copy media such as paper slip 51.

If the password is known, facility 10 then can proceed with further reutilization processing. (step 15).

If the password is unknown, a decision is made based on an estimated value of the system (step 20).

If the system value is not greater than a threshold, the system is moved to a different part of facility 10 or other disassembly and scrap facilities where systems are dismantled to harvest reusable parts or dispose of remaining scrap material. (step 25).

If the system value is greater than a threshold, workstation 300 (FIG. 4) applies signals to the system, to recover the password. (step 35).

Figure 4:
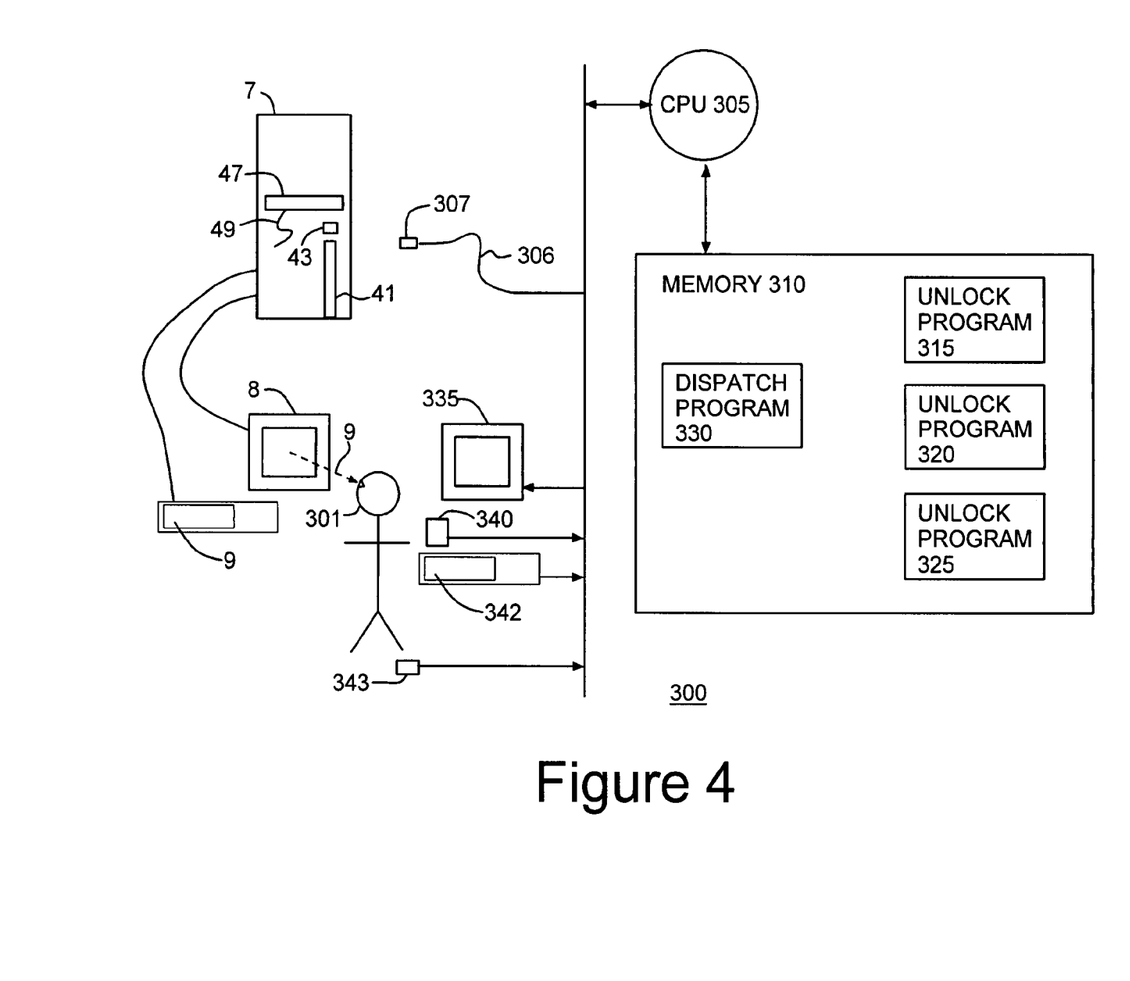
FIG. 4 is a diagram of a workstation in the exemplary system.

FIG. 4 shows workstation 300. Central processing unit (CPU) 305 executes programs 330, 315, 320, and 325 in memory 310.

Program 315 causes a set of signals to be sent through cable 306 and USB connector 307. Certain models of systems 7, from computer company 3, are responsive to the set of signals from program 315. In response to receiving the set of signals from program 315, these certain models of systems 7 will allow the setting of a supervisory BIOS password. These certain models of systems 7 constitute a first type of circuitry.

Program 320 causes a set of signals to be sent through cable 306 and USB connector 307. Other models of systems 7, from computer company 3, are responsive to the set of signals from program 320. In response to receiving the set of signals from program 320, these other models of systems 7 will allow the setting of a supervisory BIOS password. These other models of systems 7 constitute a second type of circuitry.

Program 325 causes a set of signals to be sent through cable 306 and USB connector 307. Systems 207, from computer company 203, are responsive to the set of signals from program 325. In response to receiving the set of signals from program 325, systems 207 will allow the setting of a supervisory BIOS password. These systems 207 constitute a third type of circuitry.

Dispatch program 330 controls which of programs 315, 320, and 325 to execute. Dispatch program 330 is responsive to selection of an icon by mouse 340 manipulated by operator 301, an ENTER key on keyboard 342, or activation of foot pedal 343.

Figure 5:
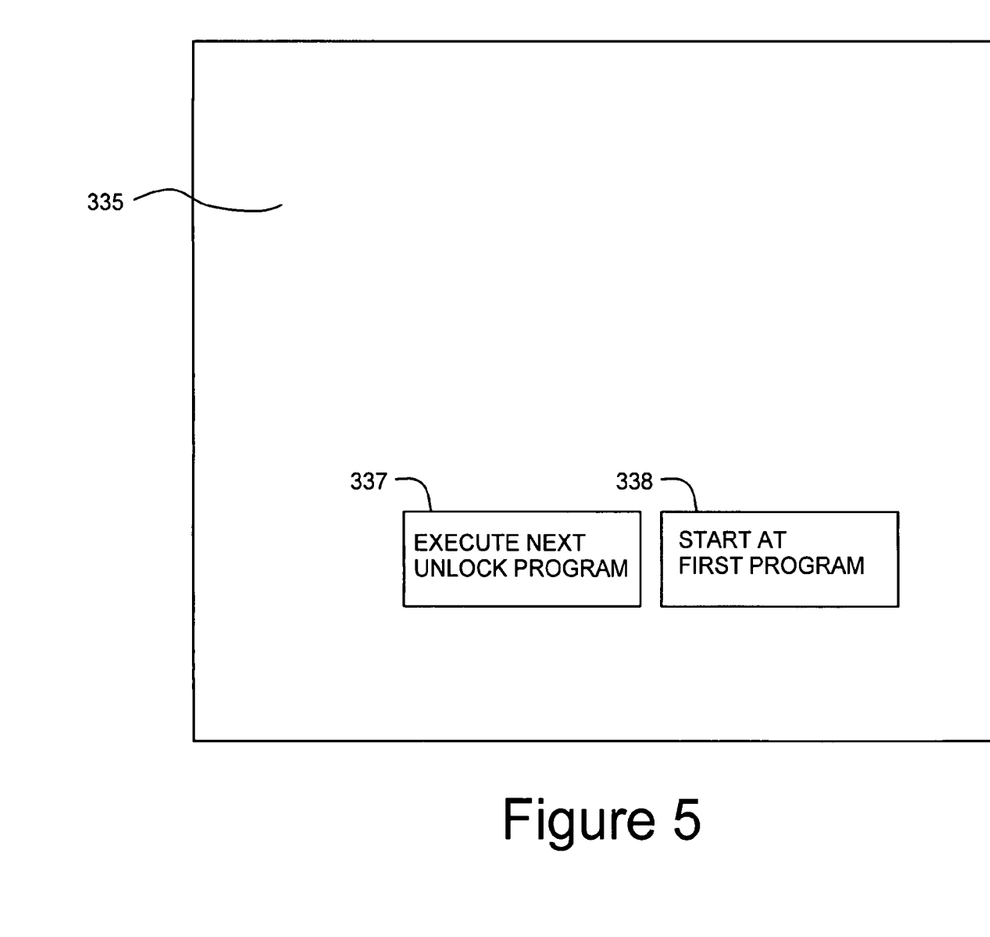
FIG. 5 is a diagram of a display screen of the circuitry that constitutes the workstation of FIG. 4.

FIG. 5 shows display screen 335 of workstation in more detail. After operator 301 connects USB connector 307 to the system currently being processed, operator 301 may use mouse 342 to select icon 338. Operator 301 then views light signal 9 emitted by screen 8 to see whether the current system remains locked. In other words, operator 301 is responsive to a light signal 9 received from screen 8 and if light signal 9 indicates the current system is still blocked, operator 301 operates selects icon 337 to execute a different unlock program.

Figure 6:
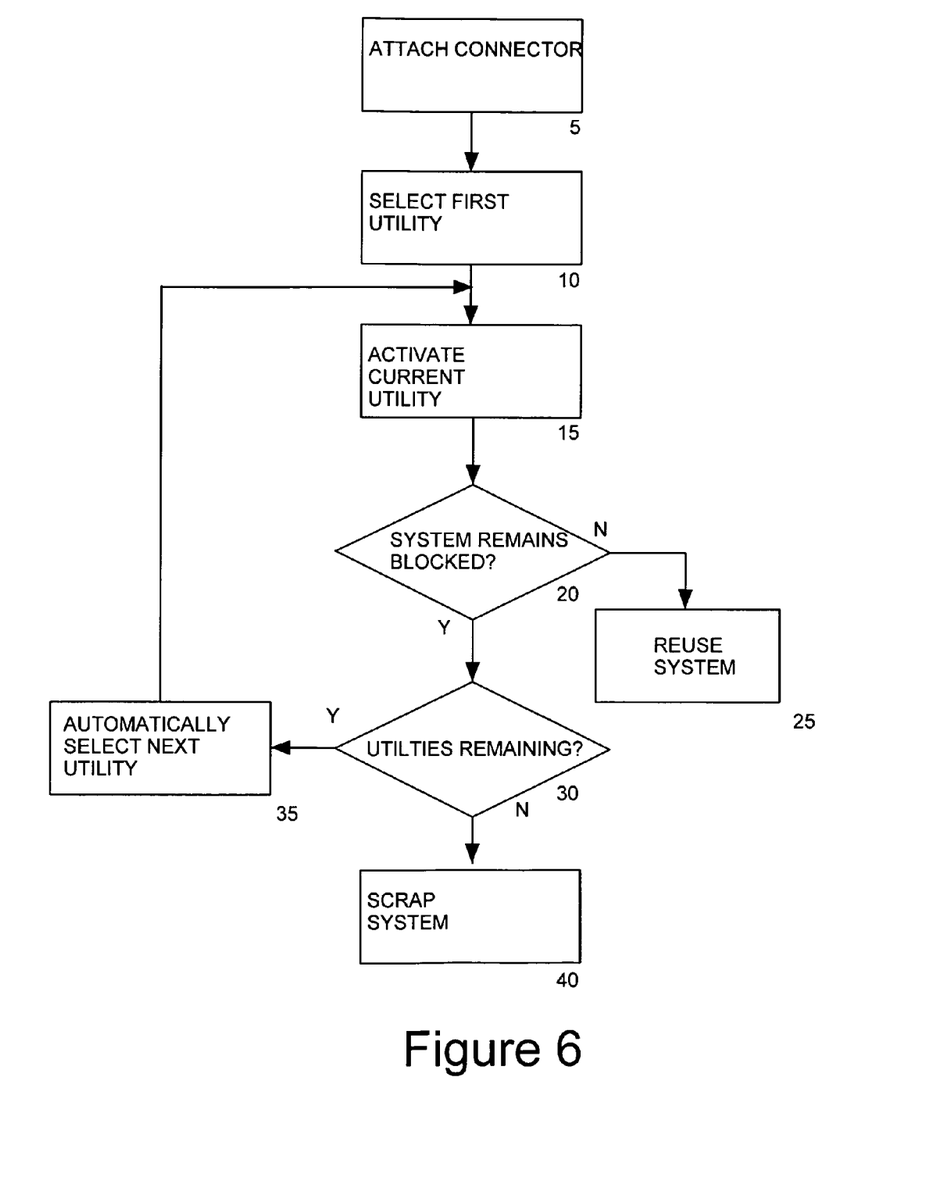
FIG. 6 is a flow chart emphasizing an aspect of the processing shown in FIG. 3.

This process is shown in more detail in connection with FIG. 6, a flow diagram of a process performed in workstation 300. After a system arrives at workstation 300, operator 301 plugs Universal Serial Bus (USB) connector 307 into USB port 43 of the system (step 5), and operator 301 then manipulates mouse 340 to select icon 338, thereby activating dispatch program 330. Dispatch program 330 selects unlock program 315 (step 10) and passes control to unlock program 315. Program 315 sends signals to processor board 41 via USB cable 306, USB connector 307, and USB port 43. (step 15).

Figure 7:
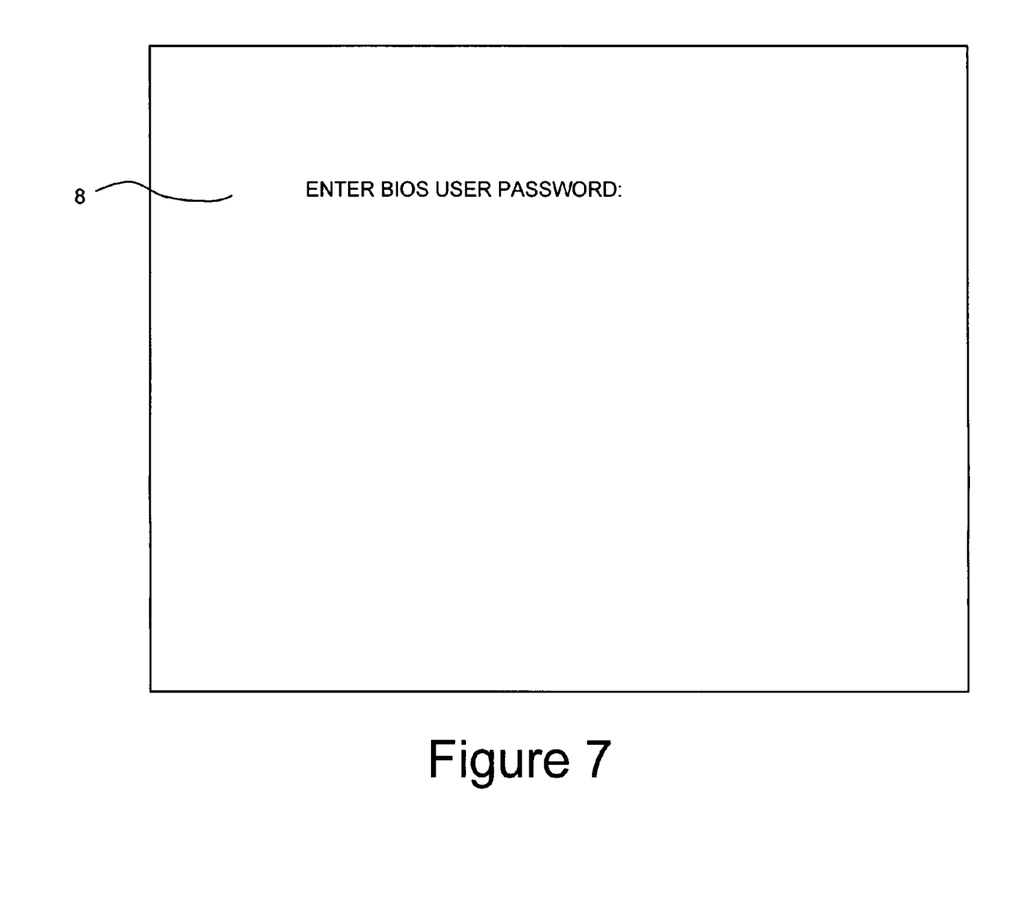
FIG. 7 is a diagram of a display screen of a computer system currently being processed by the workstation.
Figure 8:
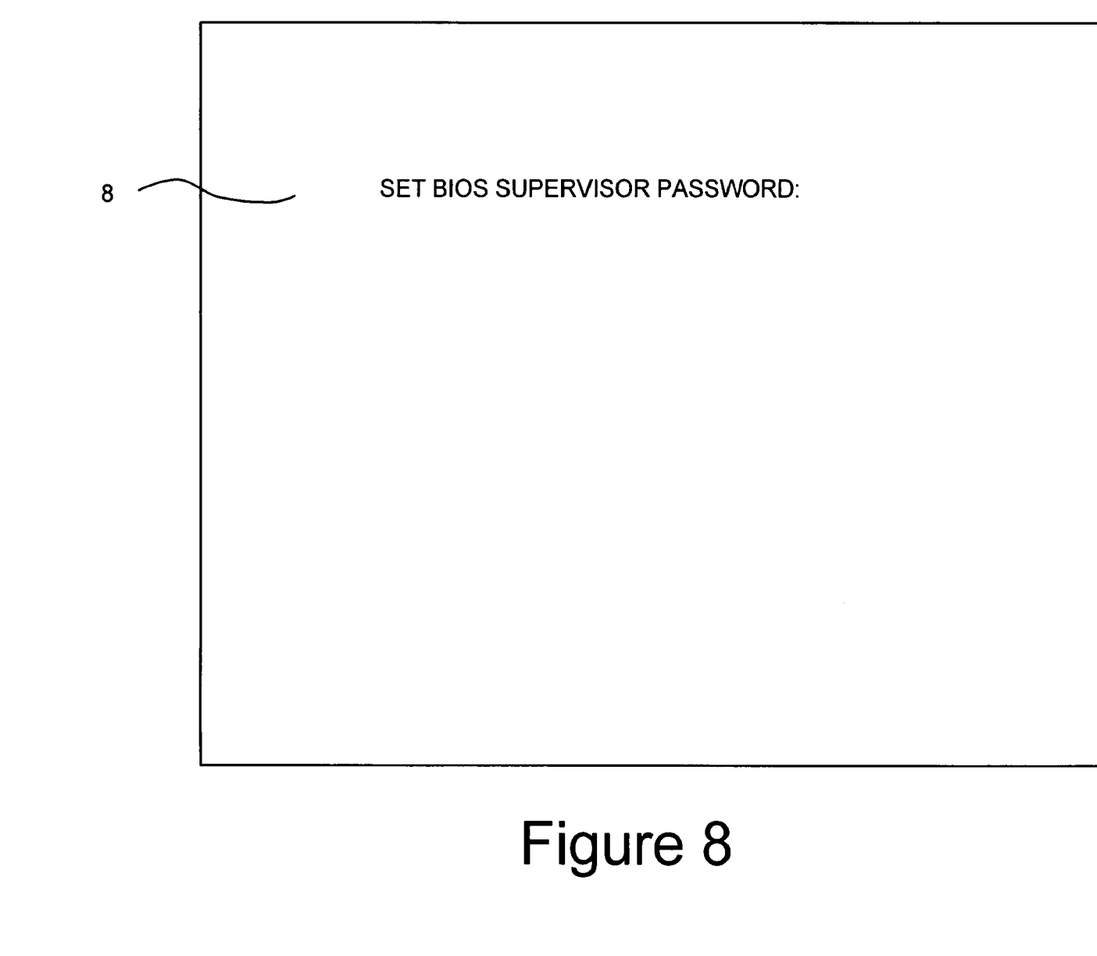
FIG. 8 is a diagram of the display screen of the computer system currently being processed by the workstation, at a subsequent time.

Operator 301 then determines whether the current system remains blocked, by viewing screen 8 being driven by the BIOS of the current system (step 20). FIG. 7 shows display screen 8 of system 7 when system 7 remains blocked. FIG. 8 shows display screen 8 of system 7 when system 7 has been unblocked.

If the system is no longer blocked, operator 301 sends the system out of workstation 300 for reuse (step 25). If the system remains blocked, operator 301 activates selects icon 337, presses the ENTER key on keyboard 342, or presses foot pedal 343, causing dispatch program 330 to determine whether there are unlock utilities remaining (step 30). If there are unlock utilities remaining, dispatch program 330 selects the next unlock program, unlock program 320 for example, (step 35) and causes the unlock program to be executed (step 15). Throughout steps 15, 20, 30, 35, 15, 20, 30, 35, etc, operator 301 does not unplug connector 307 and cable 306 from port 43.

In summary, an exemplary method receives sets 22', 26', and 24' of computer systems from retailer 21, company 25, and retailer 23, along with hardware passwords for some, but not all, of the computer systems. For each system, the method determines if access to a computer system is blocked by the lack of a password. If access is blocked and the system meets certain criteria, a CPU executes a program to send a first set of signals into a USB port of the system via a workstation connector.

If access to the system remains blocked, the CPU executes another program, to send a second set of signals into the USB port via the workstation connector.

The criteria, affecting the decision whether to unblock the system, may include technology level, product age, and/or recoverable value in an asset recovery environment where the magnitude of returns and variety of branded products is great.

As an alternative to the processing described above, a dispatch program may send test signals to the system, and receive a response to the test signals, to detect the system brand and model and thereby select the appropriate password reset program to execute.

The system may identify the last valid password and/or allows a new password to be initiated.

As another alternative, the PCs and workstation may be configured such that processor board 41 reads the BIOS password out of an EEPROM on processor board 41, and sends the BIOS password out of USB port 43. The workstation would then receive the password via USB cable 306, allowing the operator to view the accessed password on a screen at the workstation, and the operator would then unlock the PC and/or reset the password.

Second Exemplary Process

If the hard drive password is unknown, in some cases it can be accessed from the system BIOS. If it cannot be accessed this way, then the hard drive is removed and placed the test bed for password recovery, then the hard drive would be reinstalled into the system.

Figure 9A:
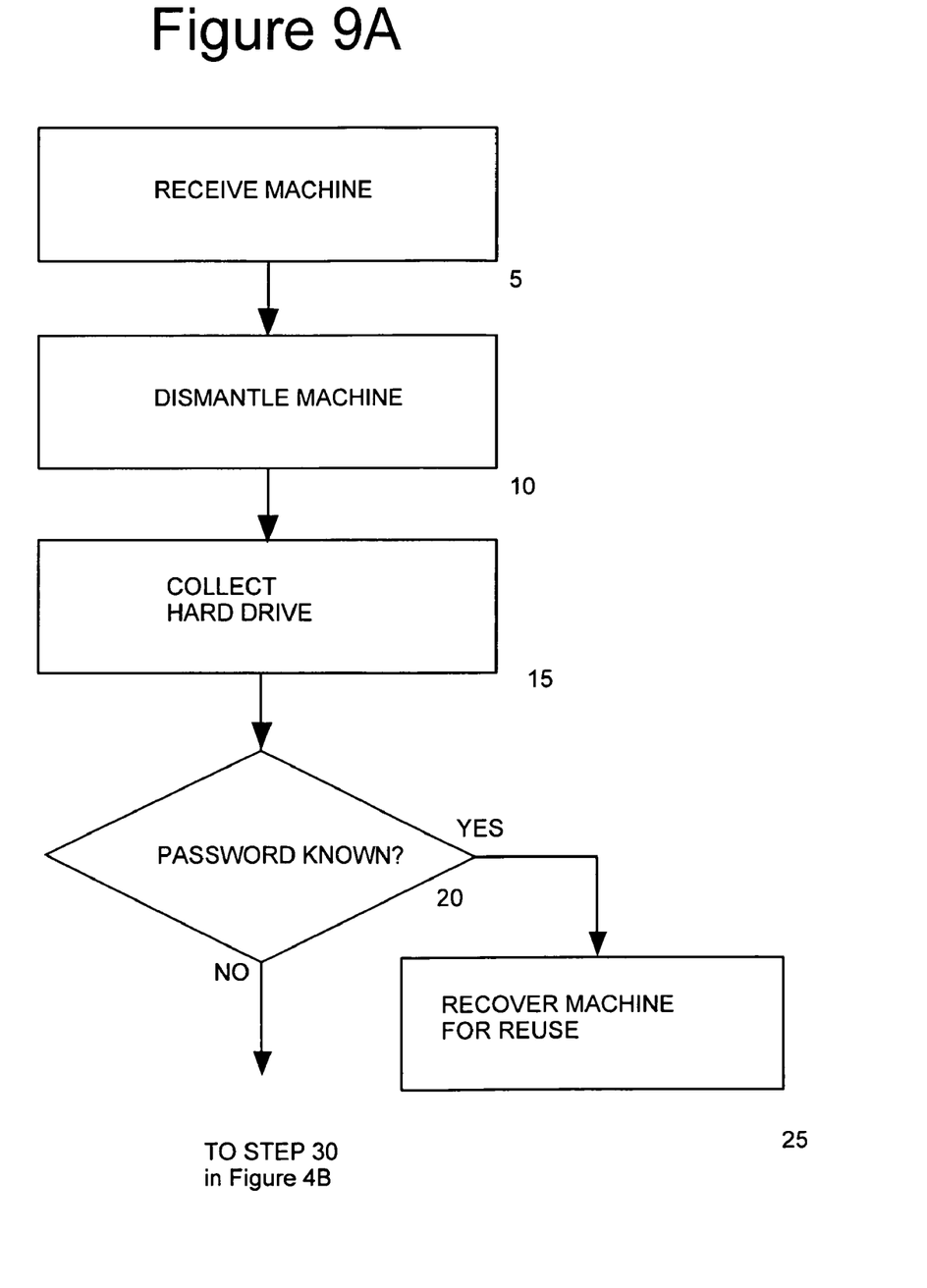
FIGS. 9A and 9B constitute a flow chart of another process performed in the exemplary system.
Figure 9B:
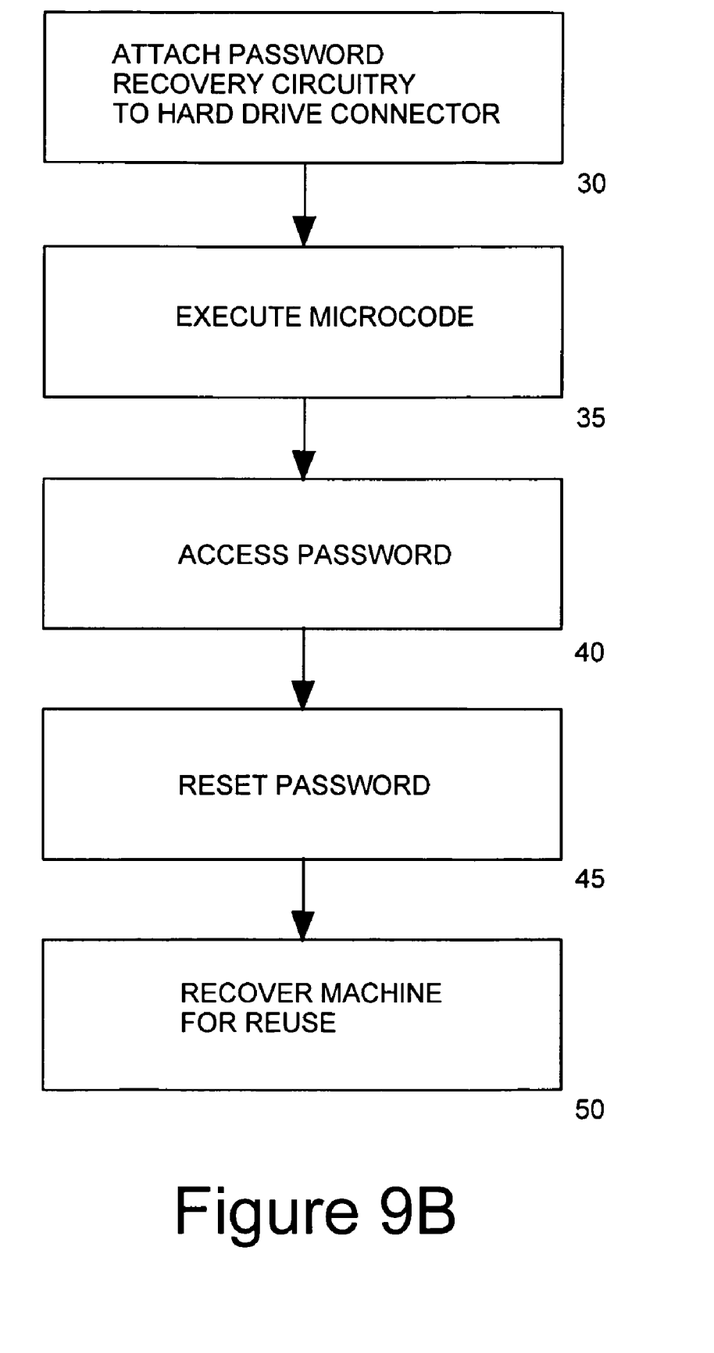

FIGS. 9A and 9B show a flow diagram of another process performed in reclamation facility 10. According to the process of FIGS. 9A and 9B, workstation circuitry is directly attached to a single loose hard drive connector or to a specially designed test bed where multiple loose hard drives can be accessed concurrently. The workstation would then execute program(s), to access the password information stored in the hard drive EPROM. Once accessed, the password would be displayed on a workstation screen and the operator would unlock or reset the hard drive password. The hard drive could then be brokered for eventual resale/reutilization.

In this Patent Application, the word circuitry encompasses dedicated hardware, and/or programmable hardware, such as a central processing unit (CPU) or reconfigurable logic array, in combination with programming data, such as sequentially fetched CPU instructions or programming data for a reconfigurable array. Thus, circuitry encompasses, for example, a hard disk drive unit, or a motherboard having a BIOS.

In this Patent Application, the term "primary password" means a password for access to BIOS or to a disk. Thus, "primary password" means "bios password", "hardware password", "power-on password", "power-up password", "CMOS password", "disk password", "hard drive password", or "HDD password".

In summary, unlock program 315 is configured to communicate with a BIOS of a first model of system from computer company 3. Unlock program 320 is configured to communicate with a BIOS of a second model of system from computer company 3. Unlock program 325 is configured to communicate with a BIOS of a system from computer company 203.

If access to a BIOS or disk is blocked by lack of a primary password, the method uses a processor to send unlock signals or brand detecting signals into a hardware port of the unit via the connector. Depending on a signal then received from the unit, the method then uses the processor to conditionally execute one of the unlock programs, to send a second set of signals into the hardware port of the unit via the connector, thereby unblocking access to the unit.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. A method of operating with a processor having access to a plurality of programs, each program configured to communicate with a respective type of circuitry, the method comprising:

receiving units of circuitry from a plurality of business entities, the receiving step including receiving primary passwords for a subset of the units, wherein the method further includes the following step, performed a respective time for each one of a plurality of units subject to the receiving step:

determining if access to a unit is blocked by lack of a primary password, wherein the method further includes the following step, performed a respective time for each one of a plurality of units for which the previous step determines that access is blocked:

determining whether a value of the unit exceeds a threshold, wherein the method further includes the following steps, performed a respective time for each one of a plurality of units for which the previous step determines that the value of the unit exceeds the threshold:

attaching a connector to the unit;

using the processor to send a first set of signals into a hardware port of the unit via the connector;

subsequently receiving a visual signal from the unit; and depending on the visual signal received from the unit, using the processor to conditionally execute one of the programs, to send a second set of signals into the hardware port of the unit via the connector, thereby unblocking access to the unit.

* * * * *